US 6,607,251 B2

(12) United States Patent  (10) Patent No.: US 6,607,251 B2
Baumgartner et al.  (45) Date of Patent: Aug. 19, 2003

(54) BRAKE BY WIRE ELECTRICAL SYSTEM ARCHITECTURE WITH MULTIPLE POWER SOURCES AND CIRCUIT PROTECTION

(75) Inventors: Ernst Severin Baumgartner, Dayton, OH (US); Bryan Peter Riddiford, Dayton, OH (US); Brandon S. Vivian, Macomb, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/959,239

(22) PCT Filed: Feb. 23, 2001

(86) PCT No.: PCT/US01/05941

§ 371 (c)(1),
(2), (4) Date: Dec. 12, 2001

(87) PCT Pub. No.: WO01/62569

PCT Pub. Date: Aug. 30, 2001

(65) Prior Publication Data

US 2002/0158511 A1 Oct. 31, 2002

Related U.S. Application Data

(60) Provisional application No. 60/184,586, filed on Feb. 24, 2000.

(51) Int. Cl.$^7$ .............................................. B60T 15/14
(52) U.S. Cl. ..................... 303/20; 303/122.05; 303/155
(58) Field of Search .................... 303/20, 122, 122.03, 303/122.04, 122.05, 155; 701/29, 39, 70, 71, 76, 92

(56) References Cited

U.S. PATENT DOCUMENTS

| | | | | |
|---|---|---|---|---|
| 4,300,088 A | * | 11/1981 | Hicks | 188/159 |
| 4,326,236 A | * | 4/1982 | McNair et al. | 188/158 |
| 4,661,910 A | | 4/1987 | Reinecke et al. | 364/426 |
| 5,961,190 A | * | 10/1999 | Brandmeier et al. | 188/159 |
| 6,088,638 A | | 7/2000 | Behrends et al. | 701/43 |
| 6,390,565 B2 | * | 5/2002 | Riddiford et al. | 303/113.4 |

FOREIGN PATENT DOCUMENTS

EP  0897208  2/1999

* cited by examiner

Primary Examiner—Pam Rodriguez
(74) Attorney, Agent, or Firm—Robert M. Sigler

(57) ABSTRACT

An electrical system architecture for a vehicle brake by wire system provides three electrical power sources: an electric generator, an electric power storage device such as a battery, and a third source which may be either an electric generator or storage device. An electric circuit has a common node and (1) connects the first electric generator to the common node through a first diode, (2) connects the first electric power storage device to the common node through a second diode, (3) connects the electric power source to the common node through one of the first and second diodes, and (4) connects the common node to the electric power inputs of control unit through circuit breaker devices. A sub-circuit within the electric circuit interconnects the first and second diodes, the common node and the first and second circuit breaker devices and isolates them within a zone protected from short circuits to points outside the zone. Voltages across the diodes are checked when the first diode should be reverse biased and again when the second diode should be reverse biased to detect circuit faults such as short or open circuits.

9 Claims, 3 Drawing Sheets

BRAKE BY WIRE ELECTRICAL SYSTEM ARCHITECTURE WITH MULTIPLE POWER SOURCES AND CIRCUIT PROTECTION

RELATED PATENT APPLICATIONS

This application references Provisional U.S. patent application No. 60/184,586, filed Feb. 24, 2000 and entitled Dry Interface Corner Brake by Wire System Architecture.

TECHNICAL FIELD

The technical field of this invention is brake by wire system electrical architecture.

BACKGROUND OF THE INVENTION

Brake by wire systems provide many advantages in brake system packaging and facilitate the expansion of new brake control features; but they also remove any direct mechanical or fluidic force transmitting path between the vehicle operator and the brake apply units. Thus, much thought is given to electrical failure modes and how to prevent loss of braking when such failure occurs. Two techniques useful in such systems are redundancy and fault monitoring. This invention combines each of these techniques in a brake by wire system electrical architecture.

SUMMARY OF THE INVENTION

The vehicle brake by wire system of this invention provides three electrical power sources. One of these is a first electric generator; another is a first electric power storage device; and the third may be either a second electric generator or a second electric power storage device. One or more brake units for wheels of a vehicle are connected for activation by one or more control units having electric power inputs.

An electric circuit has a common node and (1) connects the first electric generator to the common node through a first unidirectional current control device having a first forward voltage drop, (2) connects the first electric power storage device to the common node through a second unidirectional current device having a second forward voltage drop, (3) connects the electric power source to the common node through one of the first and second unidirectional current devices, and (4) connects the common node to the electric power inputs of control units through circuit breaker devices. A sub-circuit within the electric circuit interconnects the first and second unidirectional current devices, the common node and the first and second circuit breaker devices and isolates them within a zone protected from short circuits to points outside the zone and reduces the possibility of open circuits in the zone.

A control is provided for separately sensing a voltage across each of the first and second unidirectional current devices while controlling activation of the first electric generator and (if present) the second electric generator so as to reverse bias the other of the first and second unidirectional current devices. By interpreting the sensed voltages across the two diodes, an electrical short or open circuit may be detected in the electric circuit.

DESCRIPTION OF THE PREFERRED EMBODIMENT

Figure 1:
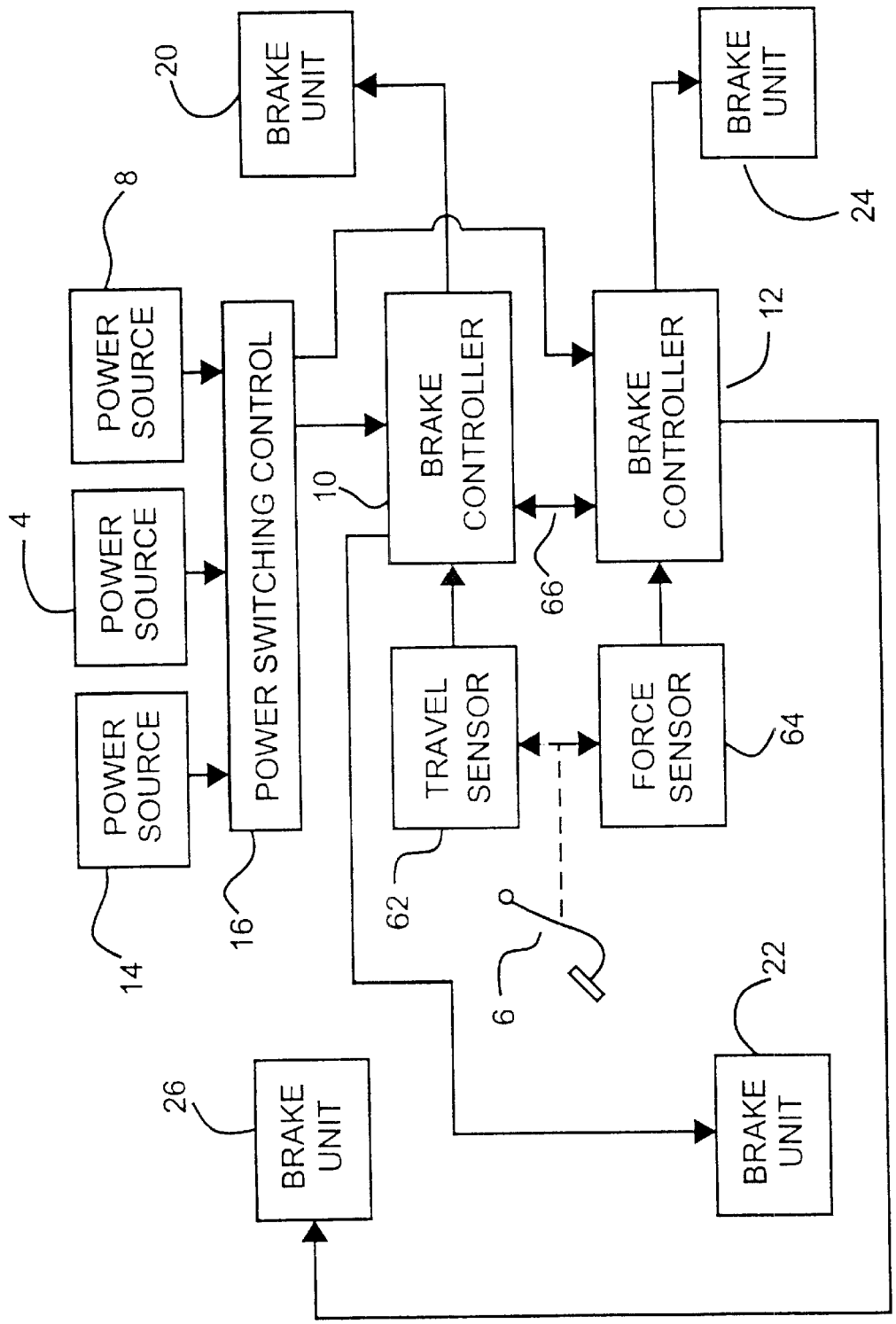
FIG. 1 is a block diagram of a brake by wire system for a motor vehicle.

Referring to FIG. 1, a brake-by-wire system comprises an electronic brake controller 10 that controls brakes at vehicle wheels in response to operator input to a brake pedal 6. Although it could control brakes 20, 22, 24 and 26 at all four vehicle wheels, in this embodiment controller 10 controls just two brakes (for example, left front brake 20 and right rear brake 22); and a second electronic brake controller 12 controls two other brakes (for example, right front brake 24 and left rear brake 26) of a brake system on a four wheel motor vehicle. The system is provided with three electric power sources, one of which is a main electric generator and one of which is an electrical storage source. The third may be either an electric generator or an electric power storage device. In this embodiment, the three electric power sources are a generator 14, a primary battery 4 and a supplementary battery 8. Generator 14 is typically an engine driven alternator providing current at a regulated voltage of 14.5 volts. Primary battery 4 is a typical vehicle battery charged to a nominal rest voltage of 12.0 volts. Supplemental battery 8 is a lower capacity battery charged to a rest voltage of 12.5 volts, higher than that of battery 4. The architecture provides a power switching control 16 for the charging of batteries 4 and 8 by generator 14 and the powering of controllers 10 and 12 from any of these electric power sources.

The operator brake input to brake pedal 6 may be sensed by one or more brake pedal sensors. In this embodiment, controller 10 is provided with a brake activation signal from a sensor 62; and controller 12 is provided with a brake activation signal from a sensor 64 for sensor redundancy. Sensors 62 and 64 may be responsive to brake pedal travel or position or to brake pedal force; in this embodiment sensor 62 is responsive to brake pedal travel or position while sensor 64 is responsive to brake pedal force. The controllers 10 and 12 exchange data over a digital communication link 66; and the controllers may exchange information from sensors 62 and 64 in normal operation, but each controller is also capable of using only its own signal to control its own two brakes if the other should fail. Neither the redundancy in brake pedal sensors nor the redundancy in controllers is critical to this invention, which is directed to the supply of electrical power; but the redundancy may contribute in a broader sense to the reliability of the entire brake by wire system.

Figure 2:
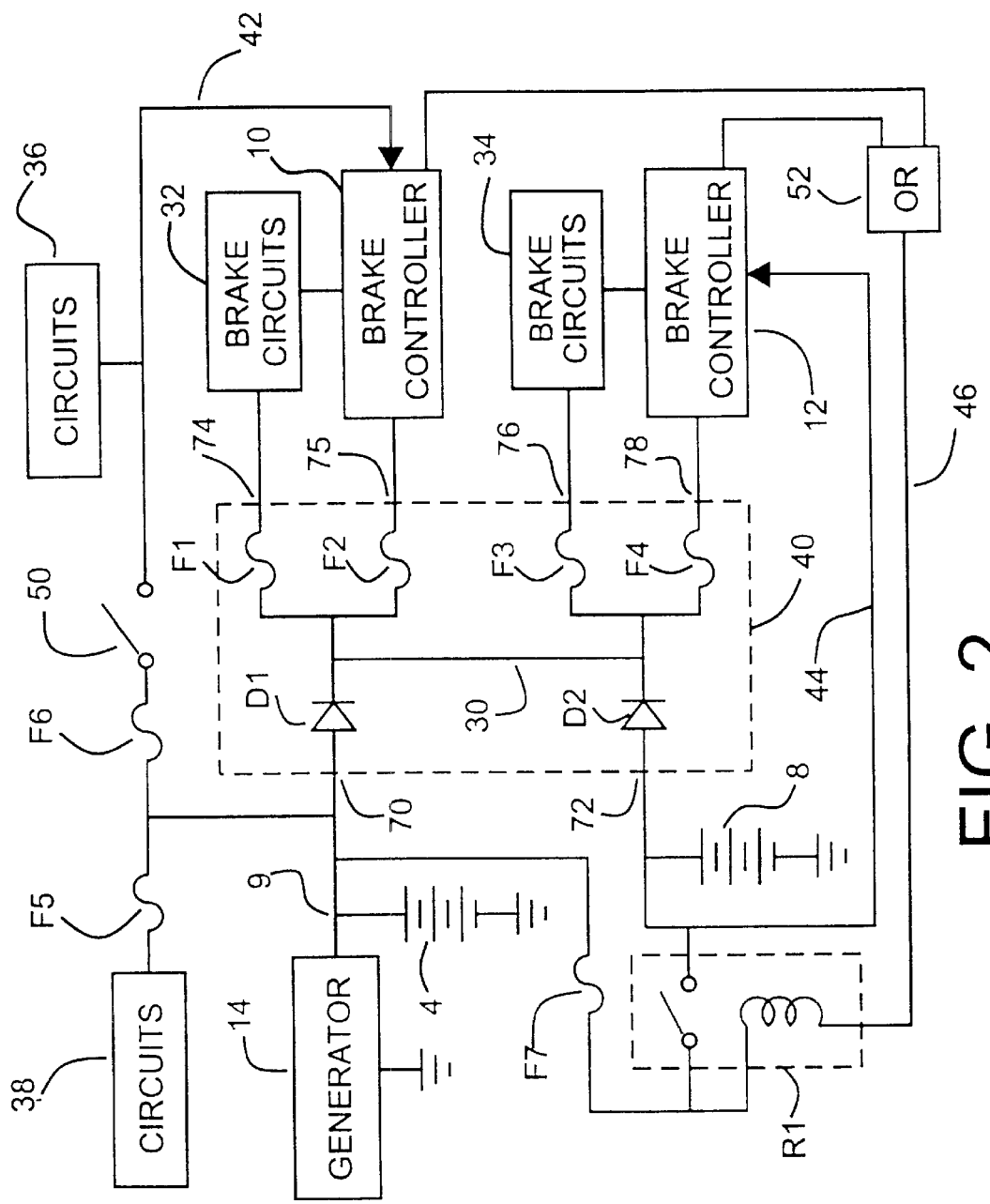
FIG. 2 is an electrical schematic diagram of an embodiment of an electrical system architecture according to this invention for use in the brake by wire system of FIG. 1.

Referring to FIG. 2, generator 14 is used to charge each of batteries 4 and 8 while also powering controllers 10 and 12, other electrical devices in the brake system and other electrical systems and accessories on the vehicle. The brake system of this embodiment is essentially split into two halves, but the connections are such that each half of the brake system can be powered by any of the three electric power sources through a dual diode arrangement. Specifically, Generator 14 has an output connected at a junction 9 to the positive (ungrounded) terminal of battery 4 and also to the anode of a diode D1. Junction 9 of the output of generator 14 and the positive terminal of battery 4 is also connected through a circuit breaker such as fuse F5 to power other non-brake and non-ignition controlled circuits on the vehicle represented as circuits 38. Junction 9 is also connected through a circuit breaker such as fuse F6 and the vehicle ignition switch 50 to power all the vehicle circuits and devices that are powered only when ignition switch 50 is closed; and these are represented by circuits 36.

Battery 4 is the main vehicle storage battery. As such, it is high in charge storage capacity and is provided with cells giving a fully charged rest voltage of, for example, 12.0 volts. Supplementary battery 8 has a positive terminal connected to the anode of a diode D2 and also, through the normally open contact of Relay R1 and a circuit breaking fuse F7, to junction 9. Generator 14 is thus connected to charge battery 8 when relay R1 is activated; and the activating coil of relay R1 is controlled in this embodiment by either of controllers 10 and 12 through an OR arrangement. Alternatively, the charging of battery 8 could be controlled by a voltage regulator. Battery 8 does not need as much charge storage capacity as battery 9, since it is operated as a supplementary and back-up battery; but it is provided with an extra cell so that it will be charged to a higher voltage than battery 4, for a reason that will be explained later.

The cathodes of diodes D1 and D2 are connected together at junction 30 in a diode/fuse arrangement defining a protected zone 40. Junction 30 is connected through a fuse F1 to supply power to other brake circuits 32, some of which, such as a brake light switch, may be controlled by brake controller 10. Junction 30 is also connected through a fuse F2 to supply power to brake controller 10. Junction 30 is similarly connected through fuse F3 to other brake circuits 34, some of which, such as a brake light switch, may be controlled by controller 12, and through a fuse F4 to brake controller 12. The arrangement of diodes D1 and D2 and accompanying fuses F1–F4 in zone 40 are protected against short circuits to points outside the zone. This may be accomplished by careful packaging in an electrically insulated package, with only required connection terminals accessible from the outside of the package: one example, although not the only structure, could involve molding the circuit elements and connecting wires within insulating material to seal them from the external world except for the external connecting terminals. The requirement is that no point within the protected zone 40, identified by the dashed line in FIG. 2, may be short circuited to any point outside the zone except through one of the external connecting terminals, which may be identified as terminals 70 (D1), 72 (D2), 74 (F1), 75 (F2), 76 (F3) and 78 (F4).

The voltage on battery 4 is provided through fuse F6, ignition switch 50 and line 42 to a voltage sense input of controller 10; and the voltage on battery 8 is provided through fuse F8 and line 44 to a voltage sense input of controller 12. Charge control outputs of controllers 10 and 12 may be combined in an "OR" circuit arrangement at 52 to control activation of relay R1 so that either controller can control relay R1. Any or all fuses may be replaced by other current sensitive circuit breaking devices.

In normal operation, generator 14 provides electric power at 14.5 volts for the vehicle and charges batteries 4 and 8 as required to maintain battery 4 at 12.0 volts and battery 8 at 13.5 volts under the control of the voltage regulators and/or brake controllers. There are many circuits and systems that could be used for this purpose that are known in the art; and the way it is accomplished is not as important as the single fact that battery 8 is maintained at a higher voltage than battery 4 by a predetermined margin. This is required so that, in this embodiment, when generator 14 is not operating, diode D2 will be conducting and diode D1 will be reverse biased by the relative voltages of batteries 4 and 8. Assuming a 0.3 volt nominal diode drop across either of diodes D1 or D2 for conduction, the conduction of diode D2 places the cathodes of both diodes (node 30) at 12.2 volts (0.3 volts less than the anode of diode D2 at the positive terminal of the higher voltage battery 8. Since the anode of diode D1 is placed at only 12.0 volts by the positive terminal of battery 4 with generator 14 not operating, diode D1 is reverse biased. A check of the voltage across diodes D1 and D2 will tell if this is the case.

The sensing of voltages across the diodes may be accomplished by reading terminal voltages at protected zone 40, for example at vehicle start-up. For example, the voltage on the anode of diode D1 is provided to brake controller 10 from terminal 70 through fuse F6, ignition switch 50 and line 42 as previously described; and the voltage on the cathode of D1 is provide through fuse F2 and terminal 75. Likewise for diode D2, the paths to controller 12 are from the anode to terminal 72 and line 44 and from the cathode through fuse F4 and terminal 78. Allowances may be made for any additional voltage drops in these paths. It is important that no additional potential short circuit paths be provided into the interior (node 30) of the protected zone 40.

When generator 14 is activated (by starting the engine that drives it or by other means) its higher voltage should change the diode conduction so that diode D1 conducts and diode D2 is reverse biased. Again, the voltages across the diodes may be checked by the controllers 10 and 12. If any of these checks before and after the activation of generator 14 do not sense voltages within specified ranges, a circuit fault is identified; and the particular nature of the fault may in most cases be determined from the precise voltage levels sensed.

Figure 3:
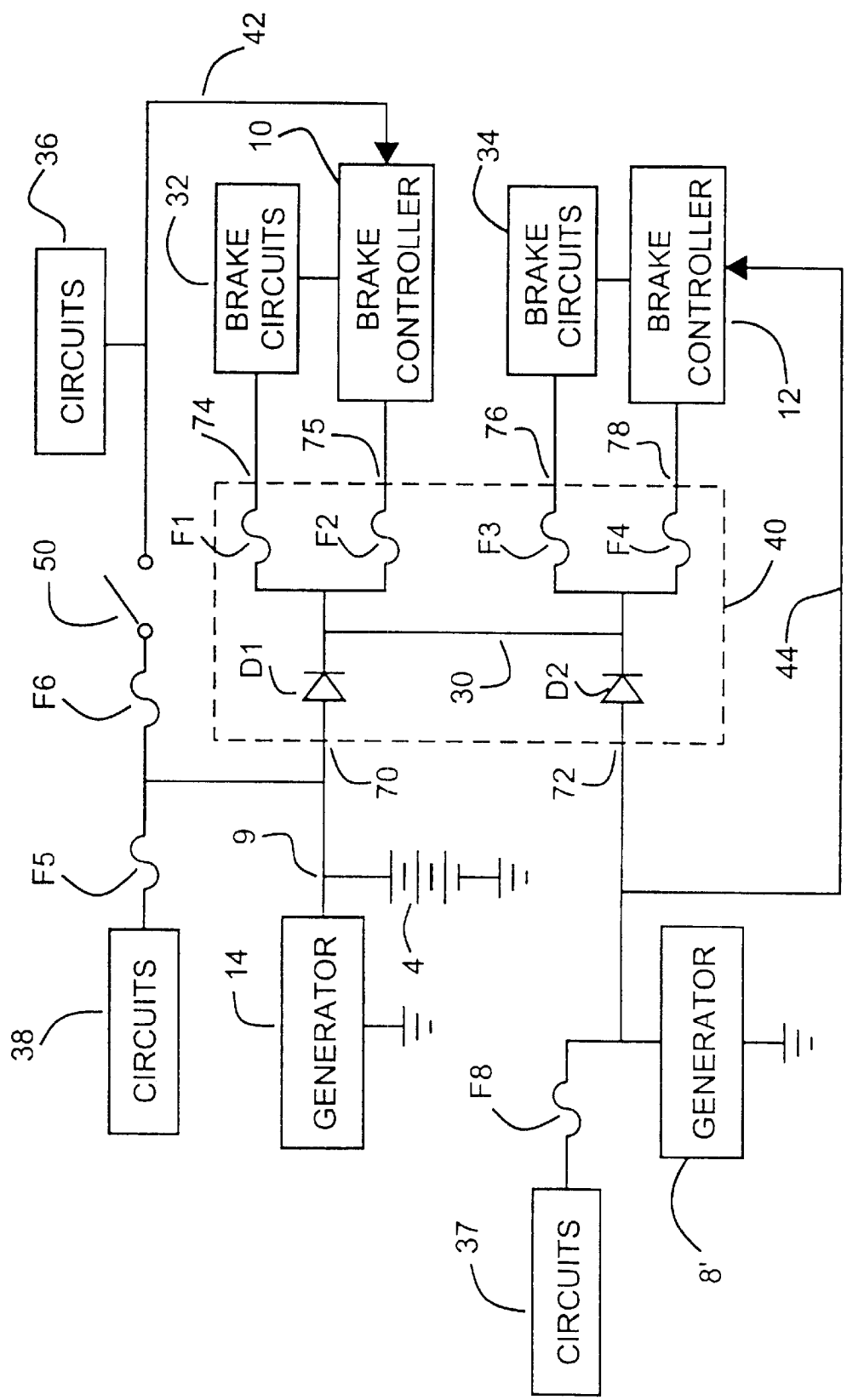
FIG. 3 is an electrical schematic diagram of another embodiment of an electrical system architecture according to this invention for use in the brake by wire system of FIG. 1.

FIG. 3 shows an alternate embodiment using two generators and one battery. Like elements in the circuit are assigned the same reference numerals as their counterparts in FIG. 2. Generator 14 of FIG. 3 may be an engine driven alternator as in the embodiment of FIG. 2 except for a lower regulated voltage of 13.5 volts, or it may be another type of generator such as a fuel cell. Battery 4 is an electric charge storage device similar to battery 4 of the embodiment of FIG. 2 with a rest voltage of 12.0 volts. Supplemental generator 8' replaces supplemental battery 8 of the embodiment of FIG. 2 and generates an output voltage when activated that is greater than that of generator 14. Generator 8' may be another engine driven alternator or it may be a fuel cell or other electric generating device, perhaps with output DC-DC voltage control. Generator 8' may supply power through fuse F8 for various circuits and devices denoted as circuits 37. The arrangement of diodes and fuses in protected zone 40 is identical to that of the embodiment of FIG. 2, as are its connections through terminals 74, 75, 76, and 78 to brake circuits 32, brake controller 10, brake circuits 34 and brake controller 12. Generator 14 and battery 8 are both connected to diode D1 through terminal 70; and generator 8' is connected to diode D2 through terminal 72 and to a voltage sense input of brake controller 12 through line 44. Junction 9 at the outputs of generator 14 and battery 4 is connected through fuse F6, ignition switch 50 and line 42 to a voltage sense input of controller 10.

In operation, as soon as ignition switch 50 is closed and before either of generators 14 or 8' are activated, diode D1 will be forward biased, diode D2 will be reverse biased (since the voltage at terminal 72 is at ground, and the required voltage sensing is available to the controllers through lines 42 and 44. The voltages across diodes D1 and D2 may thus be checked. When generator 8' is activated, its voltage needs to be higher, at least for the voltage checks, than the voltage of either generator 14 or battery 4, sufficiently to reverse bias diode D1. This may be accomplished by providing an output voltage, such as 15 volts, that is higher than either the fully charged voltage of battery 4 (12 volts) or the activated output voltage of generator 14 (13.5 volts) or by delaying the activation of generator 14 so that the voltages across the diodes may be checked with only battery 4 connected to diode D1 (generator 14 not activated) and the voltage output of generator 8' connected to diode D2 (generator 8' activated). As with the embodiment of FIG. 2 previously described, once the voltage checks have been performed, which typically occurs at vehicle start-up, any faults will be detected; and the electric power devices may all be activated for normal operation.

What is claimed is:

1. A vehicle brake by wire system comprising, in combination:

a first electric generator;

a first electric power storage device;

an electric power source comprising one of a second electric generator and a second electric power storage device;

one or more brake units for wheels of a vehicle;

one or more control units connected for activation of brake units and having electric power inputs;

an electric circuit having a common node and (1) connecting the first electric generator to the common node through a first unidirectional current control device having a first forward voltage drop, (2) connecting the first electric power storage device to the common node through a second unidirectional current device having a second forward voltage drop, (3) connecting the electric power source to the common node through one of the first and second unidirectional current devices, and (4) connecting the common node to the electric power inputs of the one or more control units through electric circuit breaker devices;

a sub-circuit within the electric circuit interconnecting the first and second unidirectional current devices, the common node and the electric circuit breaker devices being isolated within a zone protected from short circuits to points outside the zone; and means for separately sensing a voltage across each of the first and second unidirectional current devices while controlling activation of the first electric generator and the second electric generator if present so as to reverse bias the other of the first and second unidirectional current devices, whereby an electrical short or open circuit may be detected in the electric circuit.

2. A vehicle brake by wire system according to claim 1 in which the electric power source is a second electric power storage device having an output connected to the same unidirectional current device as the first generator and has a rest voltage that is less than a rest voltage of the first electric power storage device, the first electric generator having an output voltage, when activated, greater than the rest voltage of either of the first and second electric power storage devices.

3. A vehicle brake by wire system according to claim 2 wherein at least one of the first and second electric power storage devices is a battery and the first and second unidirectional current devices are semiconductor diodes.

4. A vehicle brake by wire system according to claim 1 in which the electric power source is a second electric generator connected to the same unidirectional current device as the first electric power storage device; and the first electric generator provides, when activated, a higher output voltage than the rest voltage of the first electric power storage device.

5. A vehicle brake by wire system according to claim 4 in which the second electric generator when activated has a higher output voltage than the first electric generator when activated.

6. A vehicle brake by wire system according to claim 4 in which the second electric generator is capable of being activated when the first electric generator is not activated.

7. A vehicle brake by wire system according to claim 4 in which one of the first and second electric generators is a fuel cell.

8. A vehicle brake by wire system according to claim 4 in which the first electric power storage device is a battery and the first and second unidirectional current devices are semiconductor diodes.

9. A vehicle brake by wire system according to claim 1 in which the sub-circuit includes only two electric circuit breaker devices and is contained within an insulated package having external electrically conducting terminals connected only to the first unidirectional current device, the second unidirectional current device, and each of the two circuit breaker devices.

* * * * *